S. MARTIN.
Improvement in Milk-Skimmers.
No. 129,975.  Patented July 30, 1872.
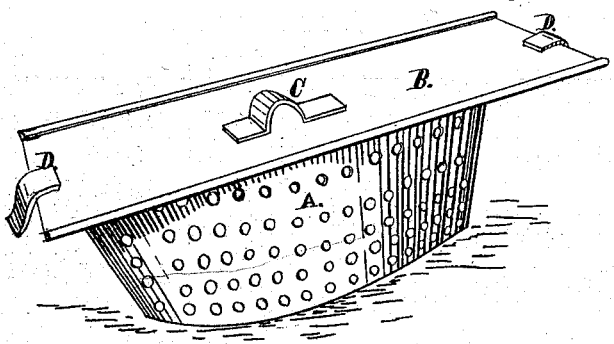
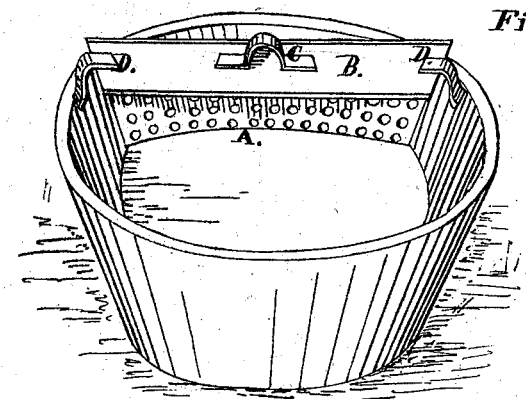

UNITED STATES PATENT OFFICE.

SAMUEL MARTIN, OF MILWAUKEE, WISCONSIN, ASSIGNOR TO HIMSELF AND ALFRED E. JANES, OF EAST HAMPTON, MASSACHUSETTS.

IMPROVEMENT IN MILK-SKIMMERS.

Specification forming part of Letters Patent No. 129,975, dated July 30, 1872.

SPECIFICATION.

I, SAMUEL MARTIN, of Milwaukee, in the county of Milwaukee, in the State of Wisconsin, have invented certain Improvements in Milk-Skimmers, of which the following is a specification:

Nature and Object of the Invention.

My invention is a skimmer for skimming milk, and it is to be used by dropping it into one side of a pan of milk and drawing the cream to one side of the pan, and then turning it round and hooking the hooks on its ends over the sides of the pan, retaining the cream on that side of the pan and turning the milk off, leaving the cream in the pan.

Description of the Drawing forming part of this Specification.

Figure 1 is a perspective view of my invention, and Fig. 2 a view of the skimmer and of a pan for the purpose of showing how the skimmer is used.

General Description.

A is the part of the skimmer perforated with holes; B, the top of the skimmer; C, the handle of the skimmer; D, the hooks on the ends of the skimmer to hook over the pan and hold it in position.

The operation of this skimmer is very simple: Take the skimmer and drop it into a pan on one side, as shown in Fig. 2, and draw it carefully to the other side of the pan, taking the cream along with it, till it comes to the other side of the pan; then take it out and turn it round the other side to and hook the hooks over the sides of the pan, and then pour off the milk, leaving the cream held between the skimmer and the side of the pan.

Claim.

A milk-skimmer consisting of parts A, B, C, and D, substantially as and for the purpose described.

SAMUEL MARTIN.

Witnesses:
   J. B. SMITH,
   E. J. SMITH.